May 6, 1958  S. A. HENDERSON  2,833,307
AIR METERING VALVE FOR ETHER CONTROL
Filed July 23, 1954
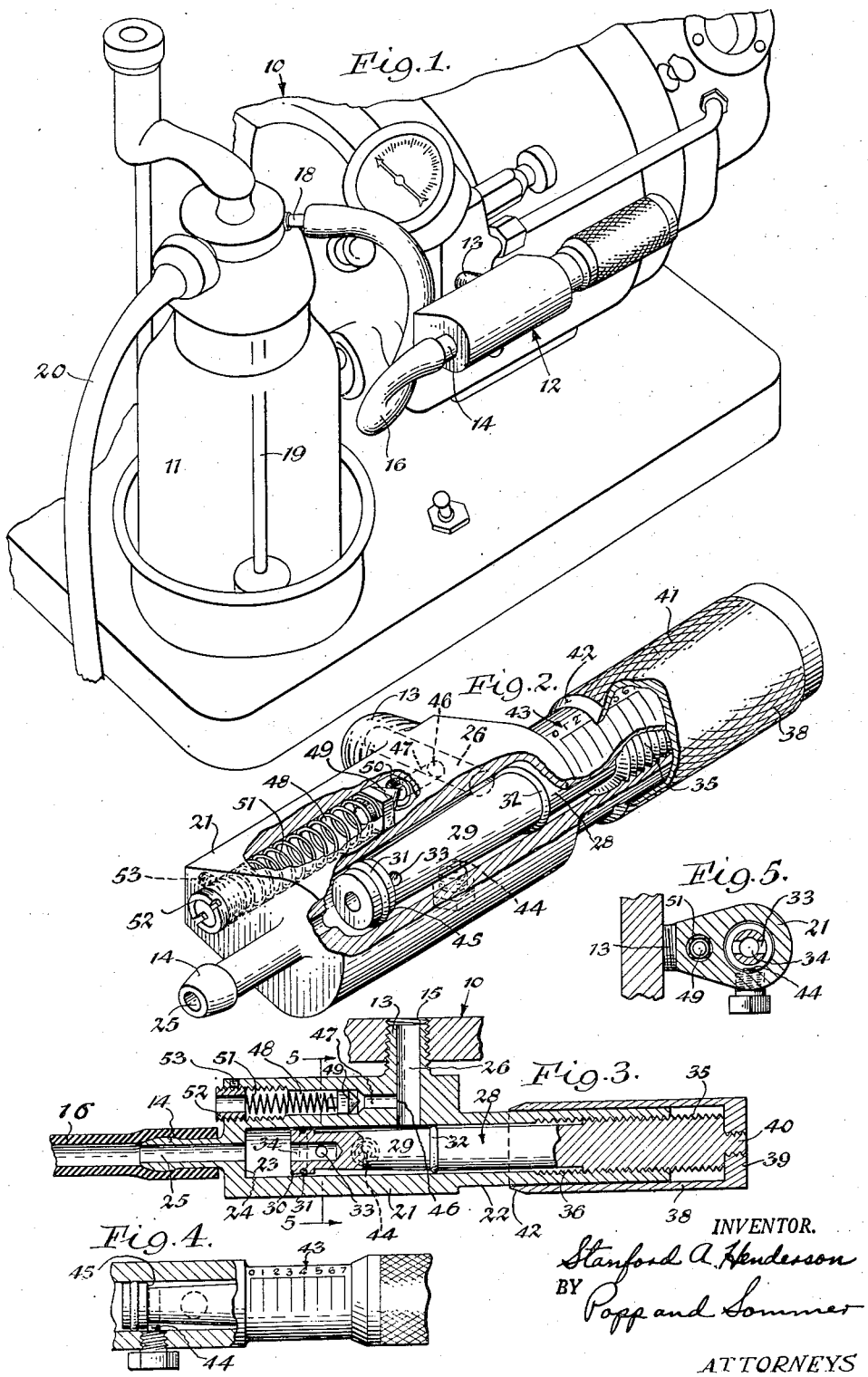
INVENTOR.
Stanford A. Henderson
BY Popp and Sommer
ATTORNEYS

United States Patent Office 2,833,307
Patented May 6, 1958

2,833,307

AIR METERING VALVE FOR ETHER CONTROL

Stanford A. Henderson, Buffalo, N. Y., assignor to Gomco Surgical Manufacturing Corp., Buffalo, N. Y., a corporation of New York Application July 23, 1954, Serial No. 445,315

2 Claims. (Cl. 137—556)

This invention relates to improvements in anesthesia apparatus, and more particularly to an air metering valve for ether control.

In administrating ether as an anesthetic, it is customary to bubble air through a body of liquid ether to vaporize some of the ether and provide an air-ether mixture which is then conducted to the patient. It is important to control the rate of admission of the air into the container of ether, which is usually a bottle, so that the desired volumetric rate of air-ether mixture is delivered to the patient. Heretofore, the instrumentalities for regulating the flow of air have not been fully satisfactory.

It is the principal object of the present invention to provide a valve which effectively meters the flow of air for ether control.

Another object is to provide such a metering valve which is readily adjustable to different predetermined rates of air flow output.

A further object is to provide such a metering valve which is highly accurate as to constancy of air output at a given adjustment for air flow.

Other objects and advantages of the present invention will be apparent from the following description and accompanying drawings in which—

Fig. 1 is a perspective partial view of anesthesia apparatus of which an air metering valve embodying my invention forms a part.

Fig. 2 is an enlarged perspective view of the air metering valve shown in Fig. 1 and showing parts of the valve broken away to reveal other parts, the valve being illustrated partially opened.

Fig. 3 is a longitudinal horizontal sectional view of the air metering valve shown in Fig. 2.

Fig. 4 is a fragmentary vertical sectional view of the central portion of the air metering valve and showing the valve opened fully to allow the maximum rate of air flow.

Fig. 5 is a transverse sectional view of the valve, taken on line 5—5, Fig. 3.

The air metering valve embodying my invention is shown as associated with an electric motor driven rotary air pump 10 and a bottle 11 containing a quantity of liquid ether. The said air metering valve is represented generally by the numeral 12 and has an inlet nipple 13 and an outlet nipple 14. The inlet nipple 13 is shown as being externally threaded and screwed into an internally threaded hole 15 (see Fig. 3) which serves as the outlet through which the air which is compressed by the pump 10 is discharged. The air metered by the valve 12, as hereafter described, leaves the valve through the nipple 14 to which one end of a flexible hose or line 16 is shown as connected. The other end of this line 16 is shown as connected to a nipple 18 which communicates with the upper end of a vertical tube 19 arranged within the bottle 11 and having its lower end arranged adjacent the bottom of the bottle and below the level of liquid ether contained therein. An outlet hose 20 is shown as connected to the bottle 11 so as to be in communication with the interior thereof above the level of liquid ether. The othre end of the outlet hose 20 is connected to the mask or other device (not shown) for administering the anesthesia to the patient.

The function of the valve 12 is to meter the air discharged from the pump 10 so that air at a predetermined volumetric rate will bubble through the liquid ether in the bottle 11 and thereby produce an air-ether mixture which will be forced through the outlet hose 20.

Turning now to the air metering valve 12 per se with which the present invention is solely concerned, such valve comprises a body which is shown as including a block 21 from one end of which the outlet nipple 14 extends as an integral part thereof and from the opposite end of which block projects a tubular extension 22. This tubular extension 22 has a cylindrical bore which extends inwardly into the block part 21 of the body, terminating short of the end thereof to provide an end wall having an inner face 21. The passage 25 of the outlet nipple 14 communicates with the bore 23. Intermediate the ends of the bore 23 is a laterally extending passage 26 which extends through the inlet nipple 13 and communicates at its inner end with the bore 23.

A metering spindle 28 is arranged for axial movement within the bore 23. This metering spindle 28 is shown as being cylindrical except for having a frusto-conical section 29 adjacent its inner end and so arranged as to leave a cylindrical head 30 at the inner extremity of the metering spindle. This head 30 is provided with an external annular groove in which a sealing ring 31 such as a rubber O-ring is arranged. Similarly the metering spindle in its cylindrical part adjacent the larger end of the frusto-conical section 29 is provided with an external annular groove in which a sealing ring 32 such as a rubber O-ring is arranged. These sealing rings 31 and 32 permit axial movement of the metering spindle 28 and at the same time engage the wall of the bore 23 so as to prevent the passage of air past these annular lines of contact.

With the metering spindle 28 arranged in the bore 23 so that the sealing rings 31 and 32 are on opposite sides of the lateral inlet passage 26, as shown in Fig. 3, it will be seen that air admitted to this passage must leave this passage to enter the bore 23 through the variable opening provided by the spacing between the inner end of the passage 26 and the opposing portion of the outer surface of the frusto-conical section 29 of the metering spindle. With the thicker part of the frusto-conical section 29 opposite the inner end of the lateral passage 26, as shown in Fig. 3, it is apparent that there is a greater restriction to the flow of incoming air than when a thinner part of the frusto-conical section 29 is opposite the inner end of this passage. Air entering the space between the exterior of the frusto-conical section 29 and the opposing wall of the bore 23 is permitted to escape from this space through a transverse hole 33 and an intersecting axial recess 34. The transverse hole 33 is provided in thte frusto-conical section 27 of the metering spindle adjacent the head 30 thereof and the axial recess 34 extends through this head 38 and opens to the outer face thereof. It will thus be seen that air is metered by adjusting the axial position of the metering spindle 28.

Means are provided for moving the metering spindle along the bore 23. For this purpose the outer end portion of the metering spindle 28 is externally threaded as indicated at 35 and these threads engage with internal threads 36 provided in the outer portion of the tubular extension 22. Turning the metering spindle in one direction will cause the threads 35 and 36 to move the spindle in one axial direction and relative movement between these threads in the opposite rotative direction will move the spindle in the opposite axial direction. To turn the spindle, a cylindrical sleeve 38 closely embraces the cylindrical tubular extension 22 and this sleeve at its outer end has an end wall 39 provided with a cylindrical hole which is internally threaded so as to receive the externally threaded stud 40 which is shown as an integral axial extension on the outer end of the spindle 28. The connection between the stud 40 and end wall 39 is rendered fast in any suitable manner. Preferably the periphery of the sleeve 38 is knurled as shown at 41 in Fig. 2 to facilitate rotative manipulation of this sleeve which controls the axial position of the metering spindle. The inner end of the sleeve is preferably tapered as indicated at 42 to provide a narrow edge on the sleeve which is adapted to traverse a scale indicated generally at 43 which is on the peripheral surface of the tubular extension 22 adjacent its inner end.

In order to limit the withdrawal of this metering spindle 28 from the bore 23, the block portion 21 of the valve body is provided with a threaded hole into which is screwed a stop pin 44 the inner end of which projects radially inwardly into the bore 23 and is adapted to engage the axially facing shoulder 45 on the inner end of the spindle head 30, as shown in Fig. 4. When it is desired to completely remove the metering spindle 28 from the valve body, the stop pin 44 is unscrewed so as to retract the inner end of this stop pin from the bore 23 and to permit the head 30 to pass over it. The stop pin 44 does not project inwardly of the bore 23 to such an extent as to interfere by contact with any portion of the external surface of the frusto-conical section 29. To facilitate tightening or loosening the stop pin 44, the same is provided with an out-of-round head at its outer end to which a wrench may be applied for this purpose.

In order to maintain a consistent pressure of air entering the bore 23 from the inner end or outlet of the lateral passage 26, a pressure relief port 46 is provided in the passage 26 in advance of this inner end or outlet. The port 46 is the inner end of a passage 47, the outer end of which enlarges into a larger passage 48. The outer end of the passage 47 is adapted to be closed by a needle valve 49 having a conical nose adapted to engage a conical seat 50 provided as a transition from the narrower passage 47 to the larger passage 48. The needle valve 49 is consistently urged inwardly toward a seated position by a helical compression spring 51 arranged within the larger passage 48, this spring having its inner end bearing against the base of the needle valve and surrounding a short centering stem thereon, and having its outer end bearing against a spring follower 52. The spring follower 52 is shown as a cylindrical tube having external threads engaging with the internal threads provided along the outer end portion of the larger passage 48.

When the valve 49 is open air passes from the lateral passage 46 to the inner passage 47 past the flat sides of the needle valve 49 into larger passage 48 and through the hole in the spring follower 52. This spring follower can be turned in or out for adjusting the initial compression in the spring 48 and to facilitate this the outer end of the spring follower 52 is shown as provided with diametrically opposed notches as shown in Fig. 2 which jointly provide a slot into which a tool such as a screw driver (not shown) can be inserted. Once the proper adjustment in the spring 51 is obtained, it can be maintained by preventing unintentional turning of the spring follower 52. This is accomplished by a set screw 53 which is arranged in the valve body with its inner end bearing against the threads on the follower 52 as shown in Fig. 3.

In the manner described, the spring 51 backing up the pressure relief needle valve 49 is adjusted so that this valve will open at a predetermined pressure, say at about 2½ pounds per square inch. However, the fine adjustment of this valve is related to the calibrations on the scale 43. As shown, this scale comprises a series of axially spaced circumferentially extending arcuate lines the innermost one of which is numbered 0 and the other lines in the scale are successively numbered from 1 to 7, the latter being the outermost line. When the inner edge of the adjusting sleeve is opposite the 0 line on the scale 43 the O-ring 32 on the metering spindle is to the left of the air inlet passage 26, as viewed in Fig. 3. In this position the end face of the spindle head 30 will be closely adjacent the end wall 24 of the bore 23 in the valve body. Turning the sleeve 38 so as to retract the metering spindle 28 from the valve body to an extent that the inner edge of the sleeve moves from the 0 line to a position where this edge is opposite the line numbered 1 on the scale 43 can be taken to indicate that a given amount of air is being metered, such as 1½ liters per minute. When the inner edge of the sleeve 38 is successively opposite the lines numbered 2 to 7 predetermined progressively greater amounts of air are metered. For example, position 2 can represent 3 liters per minute, position 3—7 liters per minute, position 4—9 liters per minute, position 5—11 liters per minute, and position 6—12½ liters per minute. All of the metering is effected by the disposition of a part of the frusto-conical section 29 of the metering spindle 28 opposite the inner end of the lateral air inlet passage 26. The metered air entering the limited space between the frusto-conical section 29 and the surrounding wall of the bore 23 passes through the branches of the transverse hole 33 into the axial recess 34, thence into the end portion of the bore 23, out the outlet nipple 44 and into the outlet hose 20. The metered air bubbles through the liquid ether contained within the bottle 11 in the manner and for the purpose previously indicated.

The present metering valve has been found to be highly effective and easy to operate to provide an accurately metered and constant flow of air for use in adminstering an ether-air mixture type anesthesia.

I claim:

1. In anesthesia apparatus, an air metering valve, comprising a body having an elongated cylindrical bore and a tubular extension forming an axial continuation of said bore, the outer end portion of said extension being internally threaded, an air outlet from said bore at that end thereof opposite from said extension, an air inlet into said bore adjacent the inner end of said extension, a cylindrical metering spindle arranged for axial movement in said bore and having a head at that end thereof which is adjacent said outlet and having its opposite end portion arranged in said extension and also having an elongated frusto-conical section intermediate said end portion and said head and adapted to move past said inlet and so arranged that the narrow end is adjacent said head, annular sealing means carried by said head and opposite end portion of said spindle and cooperable with the wall of said bore on opposite sides of said inlet at all times, passage means in said spindle to establish communication between the outer end face of said spindle head and the external surface of said frusto-conical section, threads on said spindle engaging with the aforementioned internal threads on said extension, and a manipulable sleeve surrounding said extension and fast to the adjacent end of said spindle.

2. Anesthesia apparatus as set forth in claim 1, in which a calibrated scale is provided on the exterior of said tubular extension which is adapted to be traversed and exposed at the inner end of said sleeve by axial movement thereof.

References Cited in the file of this patent

UNITED STATES PATENTS

| | | |
|---|---|---|
| 987,898 | McCurry | Mar. 28, 1911 |
| 1,406,747 | Massip | Feb. 14, 1922 |
| 1,449,472 | Wesson | Mar. 27, 1923 |
| 1,535,406 | Eynon | Apr. 28, 1925 |
| 2,020,773 | Ernst | Nov. 12, 1935 |
| 2,116,939 | Zahm | May 10, 1938 |
| 2,342,602 | Reitz | Feb. 22, 1944 |
| 2,494,279 | Baker | Jan. 10, 1950 |
| 2,568,924 | Meier | Sept. 25, 1951 |
| 2,606,573 | Brobeck | Aug. 12, 1952 |

FOREIGN PATENTS

| | | |
|---|---|---|
| 6,312 | Great Britain | 1903 |
| 426,944 | Italy | Nov. 10, 1947 |